US009489437B2

(12) United States Patent
Bansode et al.

(10) Patent No.: US 9,489,437 B2
(45) Date of Patent: Nov. 8, 2016

(54) MASTER DATA MANAGEMENT DATABASE ASSET AS A WEB SERVICE

(75) Inventors: Neelesh V. Bansode, Bangalore (IN); Thomas K. Ryan, Valley Center, CA (US); Shashank Shekhar, Patna (IN)

(73) Assignee: Teradata US, Inc., Dayton, OH (US)

( * ) Notice: Subject to any disclaimer, the term of this patent is extended or adjusted under 35 U.S.C. 154(b) by 710 days.

(21) Appl. No.: 13/250,716

(22) Filed: Sep. 30, 2011

(65) Prior Publication Data

US 2012/0084319 A1 Apr. 5, 2012

Related U.S. Application Data

(60) Provisional application No. 61/388,390, filed on Sep. 30, 2010.

(51) Int. Cl.
*G06F 7/00* (2006.01)
*G06F 17/00* (2006.01)
*G06F 17/30* (2006.01)
*G06Q 10/06* (2012.01)

(52) U.S. Cl.
CPC ..... *G06F 17/3056* (2013.01); *G06F 17/30289* (2013.01); *G06Q 10/0633* (2013.01)

(58) Field of Classification Search
USPC .......................... 726/25; 715/762; 707/802, 2
See application file for complete search history.

(56) References Cited

U.S. PATENT DOCUMENTS

| | | | |
|---|---|---|---|
| 6,038,566 A * | 3/2000 | Tsai | |
| 7,200,816 B2 * | 4/2007 | Falk et al. | 715/762 |
| 7,761,476 B2 * | 7/2010 | Miller et al. | 707/802 |
| 2004/0103073 A1 * | 5/2004 | Blake et al. | 707/1 |
| 2005/0262063 A1 * | 11/2005 | Conboy et al. | 707/3 |
| 2007/0169199 A1 * | 7/2007 | Quinnell et al. | 726/25 |
| 2009/0307187 A1 * | 12/2009 | Averbuch et al. | 707/2 |

* cited by examiner

*Primary Examiner* — Susan Chen
(74) *Attorney, Agent, or Firm* — Gates & Cooper LLP

(57) ABSTRACT

A method, system, apparatus, and article of manufacture is configured to expose a database asset as a web service. A relational database management system (RDBMS) that stores information is executed in a computer system. As part of a process and framework, a series of business rules and process workflows are maintained that manage data that resides in RDBMS tables. A rule is created that contains an application programming interface definition with predefined input and output for exposing the database asset as the web service. The rule is exposed as the web service. The web service is used to invoke a database operation based on the database asset, and to output a result.

16 Claims, 5 Drawing Sheets

MASTER DATA MANAGEMENT DATABASE ASSET AS A WEB SERVICE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/388,390, filed Sep. 30, 2010, by Neelesh V. Bansode, Thomas K. Ryan, and Shashank Shekhar, entitled "Master Data Management Database Asset as a Web Service."

BACKGROUND OF THE INVENTION

1. Field of the Invention

This invention relates in general to managing business critical data in a computer, and in particular, to exposing and making database assets available as a web service.

2. Description of Related Art

Master Data Management™ (MDM), available from the assignee of the present invention, is an application that allows users to manage their business critical data. This critical data can originate from a myriad of sources and external feeds, but ultimately, the goal is that all of this data be consolidated into a central business data warehouse. Master Data Management™ is the process and framework for maintaining a series of business rules and process workflows that will manage this data as it feeds in from multiple sources. Master Data Management™ then applies these business rules and process workflows to produce "master" data, which is then fed to all consuming business processes.

A common requirement for customers in a master data management and enterprise data warehouse (EDW) context is the ability to make database assets available as a web service. Such database assets could be tables, views, stored procedures, user defined functions (UDFs), etc. Exposing such assets as a web service assists customers and implementation teams to shorten the implementation cycle and minimizes the need for additional skill sets.

A description of queries, stored procedures, and user-defined functions may be useful to better understand the invention. Certain computer languages have been developed and utilized to interact with and manipulate the data. For example, SQL (Structured Query Language) is a language used to interrogate and process (i.e., query) data in a relational database (a database in which relationships are established between files and information stored in the database). Originally developed for mainframes, most database systems designed for client/sever environments support SQL. SQL commands can be used to interactively work with a database or can be embedded within a programming language to interface to a database. Thus, methods and functions may embed and utilize SQL commands.

Users/programmers often need to invoke the same set of commands (or the same set of commands with different parameters) at varying times and locations of a program. In such a situation, the query may be placed into a stored procedure. A stored procedure is a batch of SQL statements stored in a database/on a server, that may be partially or fully processed/compiled before it is stored (or upon its first invocation). Additionally, a stored procedure is a method or procedure written in any programming language that is partially or fully processed/compiled before it is stored (or upon its first invocation).

In addition to stored procedures, various functions and methods (referred to as UDFs) may be written by a user independently from (and without knowledge of) the underlying DBMS. UDFs often contain embedded SQL commands and additionally may be invoked or used in expressions in SQL statements.

Thus, stored procedures allow a user to group a set of SQL commands, accept parameters, and execute the SQL statements depending on those parameters. However, a UDF may be used in expressions in SQL statements.

Prior art implementations fail to provide generic implementations that expose database assets including UDFs and stored procedures as web services.

SUMMARY OF THE INVENTION

One or more embodiments of the invention provide techniques to create a generic application programming interface (API) on an application layer of a master data management system. The generic API can interact with database objects and convert the APIs to web services that can be use to expose the database objects to customers/users.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Framework/Workflow Overview

In a Master Data Management (MDM) Framework, all the master data is accessed only by MDM sanctioned data processes, also called "workflows". These workflows are central to the concept of having master data, as they become the only means by which the underlying core data can be modified. Essentially, all inbound data passes through one or more workflows that can perform the following actions on the inbound data:

Perform data quality checks;

Perform data validation;

Perform data transformations (or cleanup of data);

Identify errors in the underlying data and notify the data steward of these issues; and Migrate data into the Master or "Gold" copy of the data, where it resides in a protected manner.

Hardware and Software Environment

Master data (sometimes referred to as reference data) are facts that define a business entity, facts that may be used to model one or more definitions or view of an entity. Entity definitions based on master data provide business consistency and data integrity when multiple systems across an organization (or beyond) identify the same entity differently (e.g., in differing data models).

Business entities modeled via master data are usually customer, product, or finance. However, master data can define any entity, like employee, supplier, location, asset, claim, policy, patient, citizen, chart of accounts, etc.

A system of record is often created or selected (also referred to as a trusted source) as a central, authenticated master copy from which entity definitions (and physical data) are propagated among all systems integrated via a Master Data Management™ (MDM) framework.

The system of record can take many forms. Many users build a central database (e.g. a data warehouse or operational data store) as a hub through which master data, metadata, and physical data are synchronized. Some hubs are simply master files or tables that collect and collate records.

Figure 1:
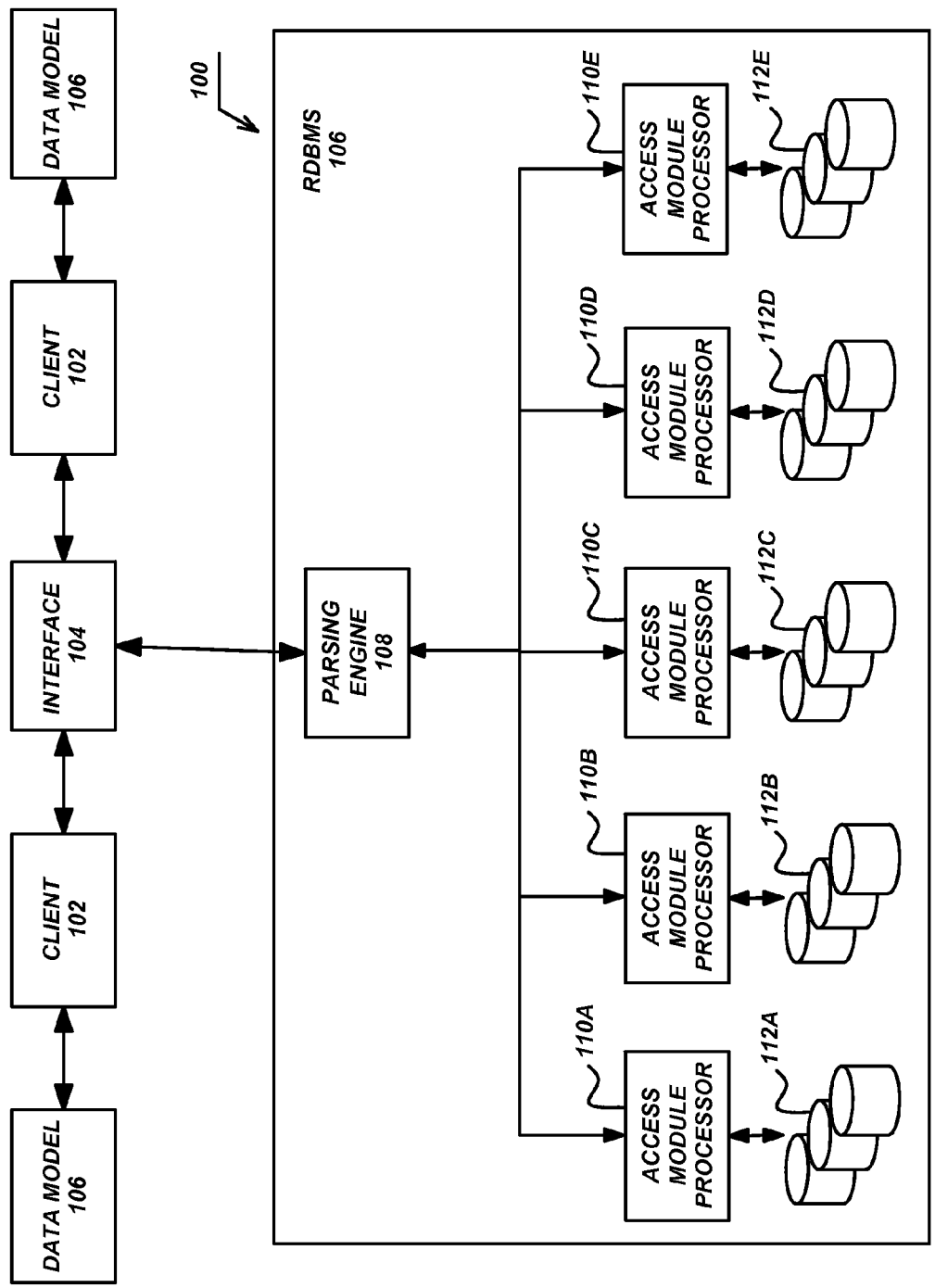
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements an improved MDM framework 100, in a three-tier client-server architecture, wherein the first or client tier provides clients 102 that may include, inter alia, a graphical user interface (GUI), the second or middle tier provides an interface 104 for performing functions and interfacing with a central database or data warehouse as described later in this application, and the third or server tier comprises the central database or data warehouse (also referred to as a Relational DataBase Management System (RDBMS) 106) that stores data and metadata in a relational database. Such an RDBMS 106 is utilized to store the master data and provide a standard format within framework 100 for the master data. The first, second, and third tiers may be implemented in separate machines, or may be implemented as separate or related processes in a single machine.

In the preferred embodiment, the RDBMS 106 includes at least one parsing engine (PE) 108 and one or more access module processors (AMPs) 110A-110E storing the relational database in one or more data storage devices 112A-112E. The parsing engine 108 and access module processors 110 may be implemented in separate machines, or may be implemented as separate or related processes in a single machine. The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, clients 102 include a graphical user interface (GUI) for operators or users of the system 100, wherein requests are transmitted to the interface 104 to access data stored in the RDBMS 106, and responses are received therefrom. In response to the requests, the interface 104 performs the functions described below, including formulating queries for the RDBMS 106 and processing data retrieved from the RDBMS 106. Moreover, the results from the functions performed by the interface 104 may be provided directly to clients 102 or may be provided to the RDBMS 106 for storing into the relational database. Once stored in the relational database, the results from the functions performed by the interface 104 may be retrieved more expeditiously from the RDBMS 106 via the interface 104. Further, each client 102 may have other data models 106.

Note that clients 102, interface 104, and RDBMS 106 may be implemented in separate machines, or may be implemented as separate or related processes in a single machine. Moreover, in one or more embodiments, the system 100 may use any number of different parallelism mechanisms to take advantage of the parallelism offered by the multiple tier architecture, the client-server structure of the client 102, interface 104, and RDBMS 106, and the multiple access module processors 110 of the RDBMS 106. Further, data within the relational database may be partitioned across multiple data storage devices 112 to provide additional parallelism.

Generally, the clients 102, interface 104, RDBMS 106, parsing engine 108, and/or access module processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

As described above with respect to FIG. 1, the master data is stored in RDBMS 106 and is accessed by clients 102 via interface 104. Such client 102 access through interface 104 is enabled by MDM sanctioned data processes referred to as workflows (e.g., provided in interface 104). Rather than being provided via interface 104, such workflows may be provided as part of parsing engine 108 or be provided by the AMPs 110 (or other parts of RDBMS 106). Consumer applications and processes may execute on clients 102 and may need to receive data from the RDBMS 106.

Database Asset Web Service Overview

The MDM framework/system 100 provides an API infrastructure (referred to as xrules) that can invoke SQLs, stored procedures, UDFs, etc. Such xrules are part of the MDM 100 services and can be exposed as a web service via interface 104. Thus, the interface 104 to the data (within the RDBMS 106) provides a framework for utilizing web services that exposes database assets in RDBMS 106 to clients 102.

To enable the use of database assets as web services, embodiments of the invention utilize two components, a design time component/artifact and a run time component/ artifact. The design time component/artifact captures information about how and what database asset needs to be exposed. The runtime component/artifact is the xrule engine for processing the request and sending the response in the required format.

Design Time Component

Figure 2:
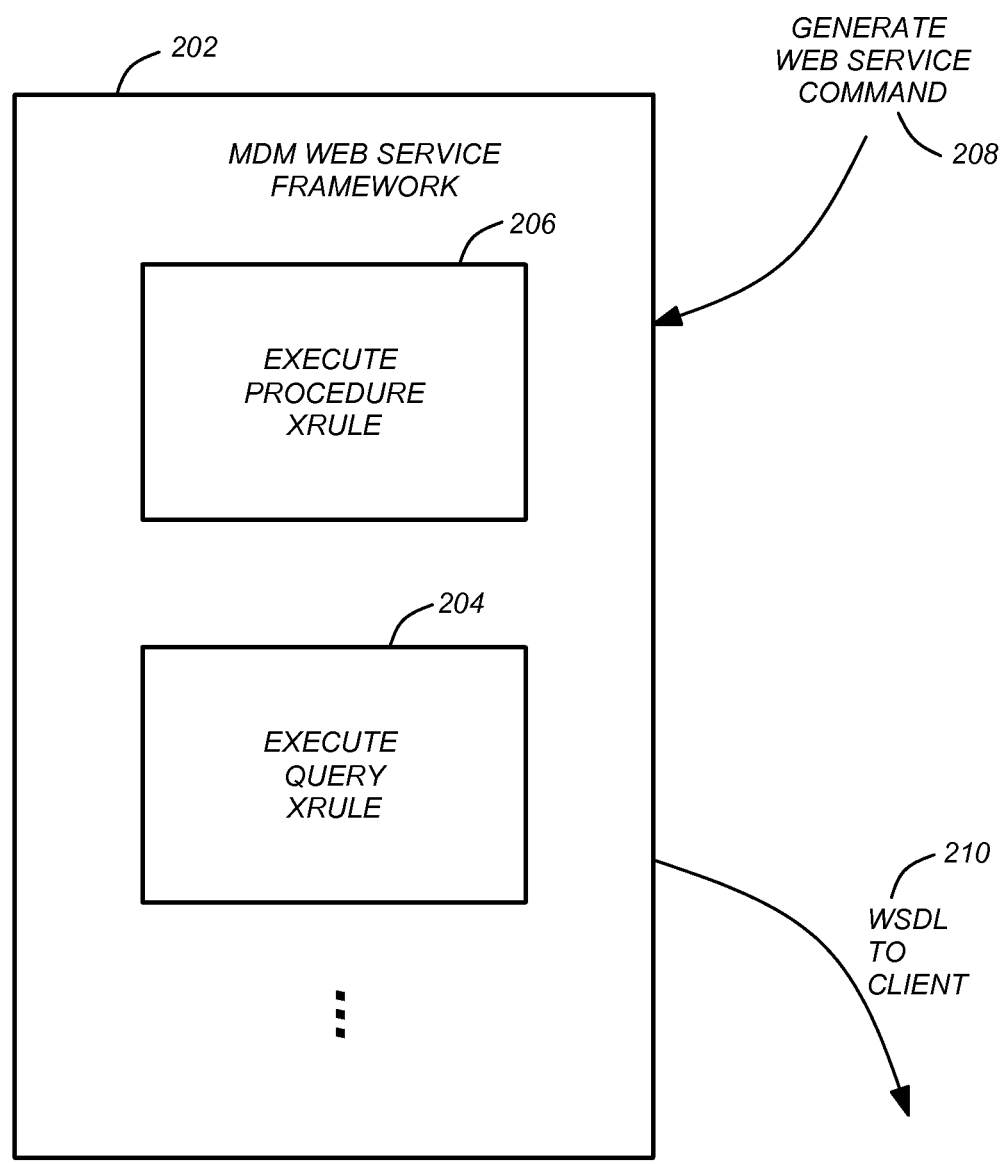
FIG. 2 illustrates the architecture of a design time component provided in accordance with one or more embodiments of the invention.

FIG. 2 illustrates the architecture of a design time component provided in accordance with one or more embodiments of the invention. The MDM web service framework 202 is established within interface 104 of FIG. 1. The design time component 202 can be divided into two (2) parts: (1) xrules; and (2) web service creation.

For xrules, embodiments of the invention create new generic xrules for exposing the database assets as web services. These xrules also contain the API definition with pre-defined input and output. Two generic xrules are described herein—execute query 204 and execute stored procedure 206.

The execute query 204 xrule exposes tables, views and other database objects as a web service. It contains the input definition for a query and allows users to select a database asset to be exposed as the web service. The execute query xrule 204 also contains a generic output definition that returns responses coming to the input query. The result set returned from the database is formatted as XML (extensible markup language) before the response is sent. The output definition can be customized to cater to the needs of the customers using this application.

The execute stored procedure xrule 206 is issued to execute a stored procedure present in the MDM's database 106. The input API definition defines parameters for the stored procedure name and input/output parameters. The output definition is generic for sending a response returned from the database 106, after formatting it in XML. The output definition can be customized to cater to the needs of the consuming application.

The second part for design time component 202 is that of web service creation. In this step, the defined xrules 204-206 are exposed as web service operations. The access level of the xrules 204-206 is changed to public and MDM's existing web service generation mechanism is used to create the web service. Thus, after modifying the access level, a generate web service command 208 (from MDM's existing web service generation mechanism) is issued. This generates a WSDL (web services description language) file 210 (with the required operations) that is sent to the client 102.

Run Time Component

Figure 3:
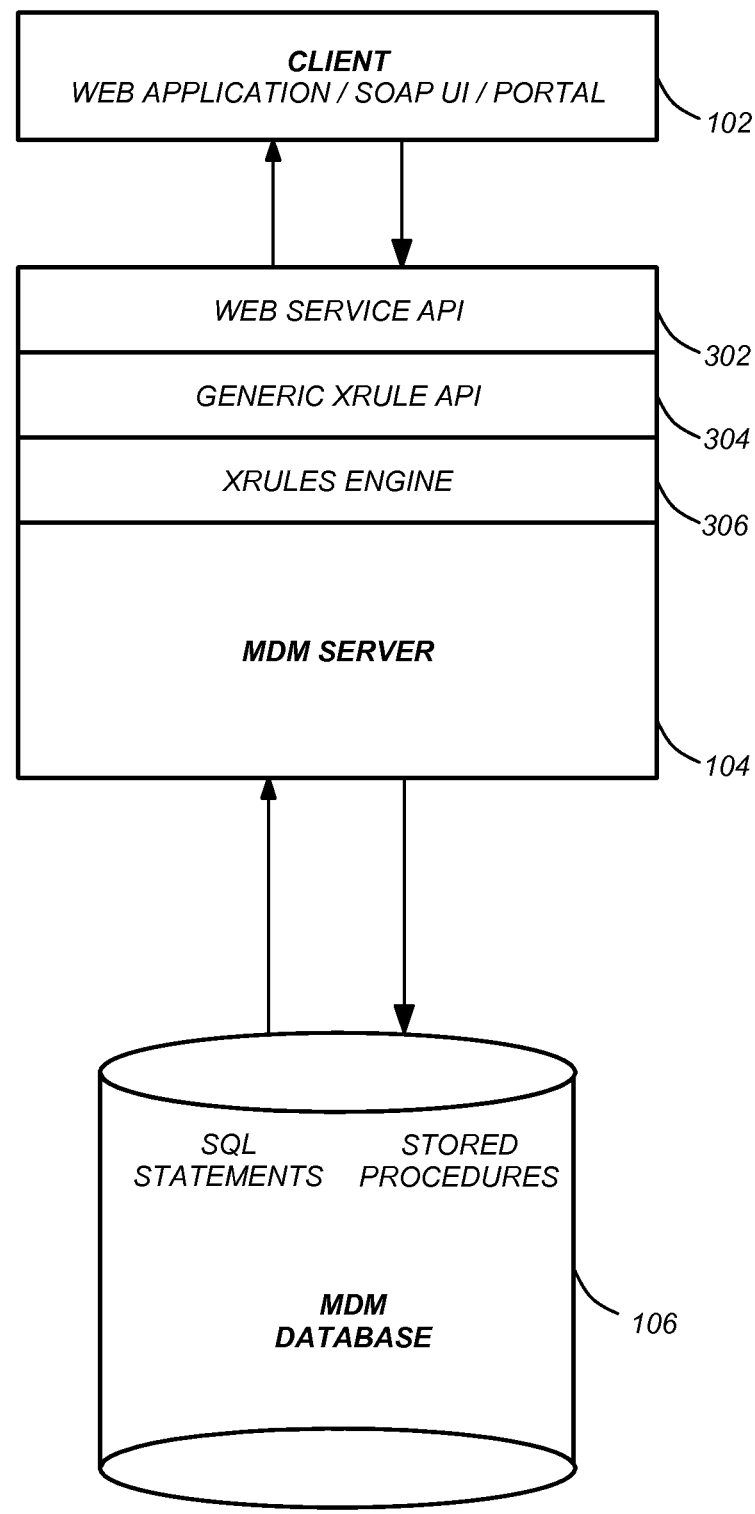
FIG. 3 illustrates the run time architecture for supporting database asset webs service functionality in accordance with one or more embodiments of the invention.

FIG. 3 illustrates the run time architecture for supporting database asset webs service functionality in accordance with one or more embodiments of the invention. The run time component can be divided into two parts: (1) manage query and store procedures; and (2) invocation.

Referring again to FIG. 2, the design time component 202 receives a request to invoke a web service 208 from the client 102. Referring to FIG. 3, the MDM server 104 maintains a web service API 302 that is invoked by the client 102 using the generate web service command 208. The client 102 may utilize a web application, SOAP (simple object access protocol) user interface (a protocol that allows for bi-directional message exchange between the client 102 and server 104), or a portal to perform any desired functions including accessing any APIs in server 104.

Such web service APIs 302 may be utilized to provide a user interface for the client 102 to define a query or specify a stored procedure. As used herein, these user interfaces may be referred to as manage query and/or stored procedures components. Such components are the existing MDM user interfaces 302 for managing database assets (e.g., SQL statements and stored procedures) within the MDM database 106. Embodiments of the invention leverage these features for fulfilling the required objective. Using the manage query user interface feature, a query with parameters is defined. This query is used to select the database object. The use of the manage query functionality instead of using direct queries provide greater security so that only the desired database object is exposed.

The second component is that of invocation. Once the web service is generated and the WSDL 210 is sent to the client 102, the client 102 uses the WSDL 210 to execute the database 106 operation. The request for the query comes in the SOAP format and the MDM server 104 converts it to MDM readable format (i.e., into a generic xrule API 304). The MDM readable format is then passed to the xrule engine 306. The xrule engine 306 performs the database 106 operation and converts the result set to XML. This XML is again wrapped into a SOAP formatted response and set back to the client 102.

In view of the above, MDM can provide an out of the box generic xrule 304 that can query any table or execute any stored procedure. In addition, a manage query feature allows the user to pre-define the query (e.g., using a web service API 302) and use the generic xrule 304 to invoke the stored query. Similarly, a manage stored procedure user interface can be leveraged to invoke any stored procedure.

Database Asset Web Service Exemplary Implementation

Design Time Component

As described above, there are two stages for exposing database assets as a web service. In the first stage, the design time architecture can further be divided into two parts—generic xrules and web service creation.

With respect to the generic xrules, two xrules, namely, execute query and execute stored procedure, are created for fulfilling the requirement of exposing database objects as web services. The execute query xrule defines a query name as an input parameter and a generic response as the output. The output for the response (e.g., to the display or to the MDM database) may include the name of the query, parameters of the query, the time taken, and the start time. In addition, if the query complies with certain conditions (e.g., utilizing a SELECT or SEL command), the query may be executed against the data in the database 106.

With respect to the execute stored procedure xrule, the xrule defines a stored procedure name and input/output parameters as input variables. A generic response is set as output for the operation. Accordingly, the xrule provides for specifying the procedure name and input parameters that are used to execute the stored procedure based on the data in database 106 and returning any results as necessary.

The web service creation component uses the existing MDM web service framework 100 to expose the MDM database 106 assets xrules as web service operations 302. Initially, the access level for the xrules 304 (whether an execute query xrule or execute stored procedure xrule) is changed to "public". A generate web service command 208 is then given. The command 208 generates a WSDL 210 with the required operations that is sent to the client 102.

Run Time Component

As describe above, the run time component is also divided into two parts—the manage query and stored procedures component and invocation component.

Figure 4:
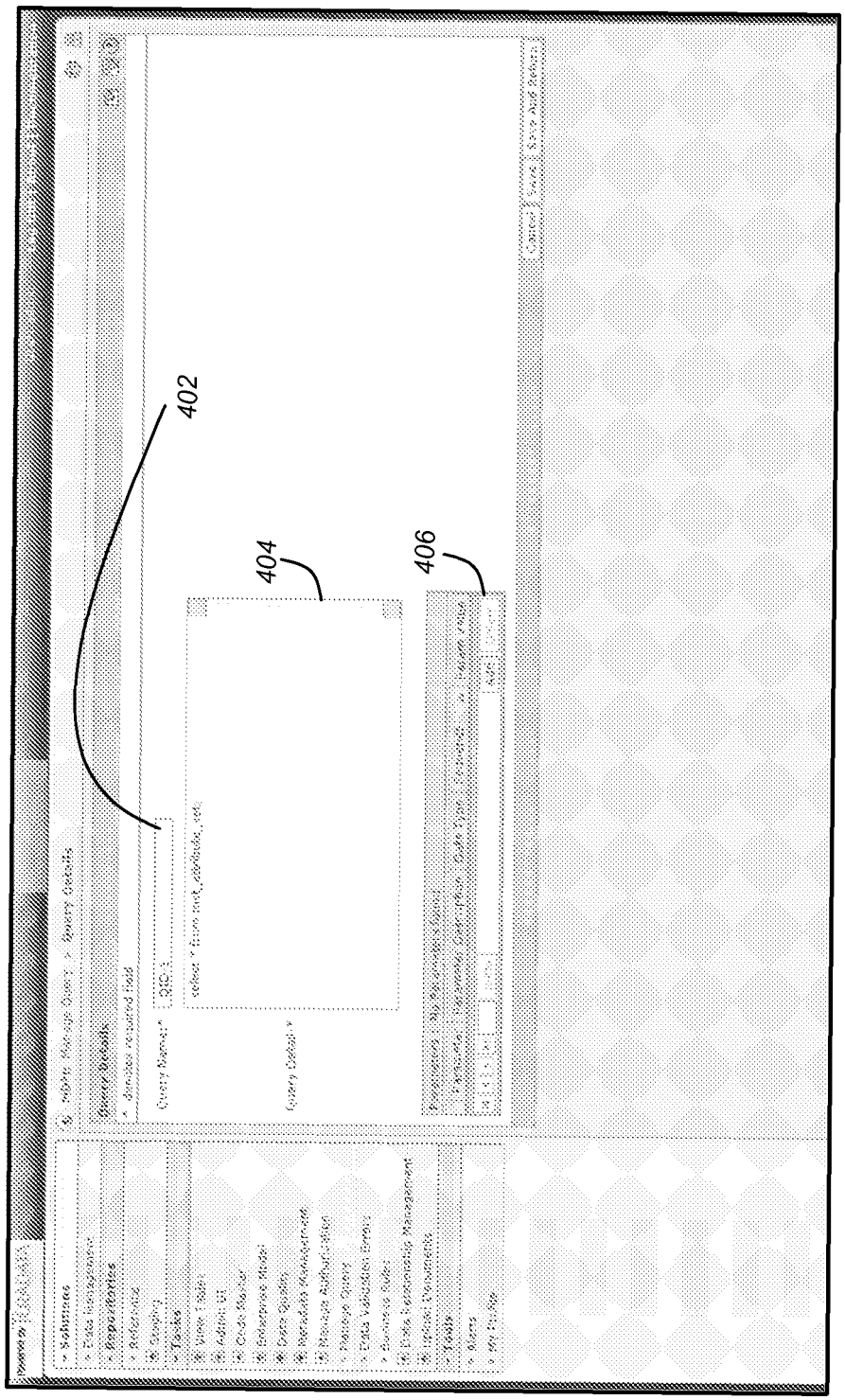
FIG. 4 illustrates a manage query graphical user interface used to define a query in accordance with one or more embodiments of the invention.

The manage query and store procedures component provides that the query used for exposing the database asset is defined using the "manage query" UI. A query name is given to the SQL that is used during the invocation. FIG. 4 illustrates a manage query graphical user interface used to define a query in accordance with one or more embodiments of the invention. As illustrated, a query name 402 and details 404 can be specified by the user. Additionally, the user has the option of specifying various parameters 406.

The generated WSDL along with the query details are provided to the client 102. The client 102 then uses the received information to fetch the data from the database 106. For the execute query xrule, the request to the database 106 contains a query name with the query ID (e.g., the operation for accessing tables, views, etc.). For example, the following text may be used as part of a request:

```
<bcm: executeQueryId>
    <QueryName Value="QID-1"/>
</bcm: executeQueryId>
```

Such a request may be SOAP formatted.

The response may have a result set indicated a successful query execution, a number of rows in the result set, and the list of results. For example, the following indicates the result set in accordance with one or more embodiments of the invention.

```
<soap:Body>
    <executeQueryIdResponse TotalRowCount="12" Status="Success">
        <SQL_RESULT>
            <Attribute_Set_ID Value="AS3"/>
            <UPDTD_LOG_TABLE_NAME Value="LT3"/>
            <UPDTD_PHY_TABLE_NAME Value="PT3"/>
            <DESCRIPTION/>
            <NAME Value="Attribute Set3"/>
            <SYS_TARGET_ID/>
            <SYS_AUTH_ID/>
            <SYS_SOURCE Value="BackEnd"/>
            <SYS_CREATED_BY/>
            <SYS_CREATION_DATE/>
            <SYS_ENT_STAT/>
            <SYS_LAST_MODIFIED_BY/>
            <SYS_LAST_MODIFIED_DATE/>
            <SYS_NC_TYPE/>
            <SYS_ERR_CODE/>
            <SYS_ERR_SVRTY/>
        <SQL_RESULT>
        <SQL_RESULT>
            <Attribute_Set_ID Value="ASID5"/>
            <UPDTD_LOG_TABLE_NAME Value="LogTable5"/>
            <UPDTD_PHY_TABLE_NAME Value="PhyTable5"/>
            <DESCRIPTION/>
            <NAME Value="Attribute Set5"/>
            <SYS_TARGET_ID/>
            <SYS_AUTH_ID/>
            <SYS_SOURCE Value="BackEnd"/>
            <SYS_CREATED_BY/>
            <SYS_CREATION_DATE/>
            <SYS_ENT_STAT/>
            <SYS_LAST_MODIFIED_BY/>
            <SYS_LAST_MODIFIED_DATE/>
            <SYS_NC_TYPE/>
            <SYS_ERR_CODE/>
            <SYS_ERR_SVRTY/>
        <SQL_RESULT>
```

Such text illustrates a result set that includes the name of the result set and additional output parameters for the SQL query.

For the execute stored procedure operation, the input will contain the stored procedure name and IN/OUT parameters. The following illustrates a portion of the exemplary input for an execute stored procedure xrule:

```
<soapenv:Body>
    <bcm:executeStoredProcedure>
        <STOREDPROCNAME Value="Square_proc"/>
        <!—Zero or more repetitions:-->
        <IN Name="inp1" DataType="string" Value="input val"/>
        <IN Name="inp2" DataType="int" Value="25"/>
        <!—Zero or more repetitions:-->
        <OUT Name="out_param" DataType="string" Value="?"/>
    </bcm:executeStoredProcedure>
</soapenv:Body>
```

As can be seen, the stored procedure name and input/output parameters are specified. The response to the execute stored procedure operation contains the database response formatted as XML. Below is an example of a result set for an execute stored procedure operation.

```
<soap:Body>
    <executeStoredProcedureResponse Status="Success">
        <_RESULT Value="SUCCESS"/>
        <RESPONSE status="Success">
            <out_param Value="Square of 25 is 625"/>
        </executeStoredProcedureResponse>
</soap:Body>
```

As illustrated, the stored procedure "Square_proc" receives input in the form of a number and outputs the square of that number. The above XML outputs a success status and a square of 25 (i.e., 625).

Logical Flow

Figure 5:
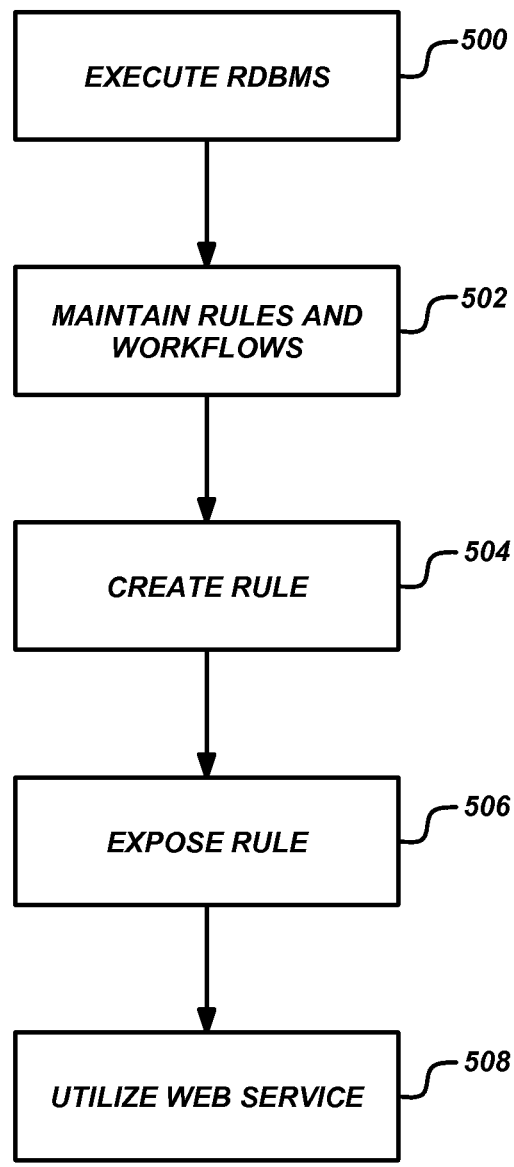
FIG. 5 is a flow chart illustrating the logical flow for exposing a database asset as a web service in accordance with one or more embodiments of the invention.

FIG. 5 is a flow chart illustrating the logical flow for exposing a database asset as a web service in accordance with one or more embodiments of the invention.

At step 500, a relational database management system (RDBMS) is executed and stored information in a computer system.

At step 502, as part of a process and framework, a series of business rules and process workflows are maintained to manage data that resides in RDBMS tables.

At step 504, a rule is created (via the process and framework) that contains an application programming interface (API) definition with predefined input and output for exposing the database asset from the RDBMS as a web service. The rule may be created by selecting/accepting user input that selects the database asset from the RDBMS. In one or more embodiments, the database asset may be query. The query and parameters for the query may be defined using a managed query user interface that limits exposed functionality to provide/enhance security. In one or more embodiments, the database asset may be a stored procedure where the predefined input includes received input that defines parameters for a name of the stored procedure and input/output parameters.

At step 506, the rule is exposed (via the process and framework) as the web service.

At step 508, the web service is utilized (via the process and framework) to invoke a database operation based on the database asset and to output a result. The output may be provided in XML. Further, the web service may be used to invoke the operation by converting a request received via the web service into a readable format (e.g., MDM format), a rule engine performing the operation using the request to obtain the result, the rule engine converting the result to a client format (e.g., XML and/or SOAP), and outputting the client format to a client/user.

Conclusion

This concludes the description of the preferred embodiment of the invention. The following paragraphs describe some alternative embodiments for accomplishing the same invention. In one alternative embodiment, any type of computer or configuration of computers could be used to implement the present invention.

One or more embodiments of the invention allows customers to expose any enterprise data warehouse asset as a web service without any development cycle. Standard security features can be added on top of a generic web service infrastructure to perform certificate based authentication or any other type of authorization as required.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for exposing a database asset as a web service, comprising:
    (a) executing a relational database management system (RDBMS) that stores information in a computer system, wherein:
        (1) the RDBMS is part of a centralized framework that is configured to control access to the information;
        (2) one or more business rules and one or more workflow data processes manage the information from multiple sources;
        (3) the one or more business rules and the one or more workflow data processes are applied to the information from multiple sources, to consolidate the information and produce master data;
        (4) the master data is stored in a central business database of the RDBMS;
        (5) the master data is fed to one or more consuming business processes; and
        (6) access to, management of, and usage of, the master data is limited to the one or more workflow data processes of the centralized framework;
    (b) creating, via the centralized framework, a rule, of the one or more business rules, that contains an application programming interface (API) definition with predefined input and output for exposing the database asset from the RDBMS as the web service;
    (c) exposing, via the centralized framework, the rule as the web service; and
    (d) utilizing, via the centralized framework, the web service to invoke a database operation based on the database asset, and to output a result.

2. The method of claim 1, wherein the creating comprises selecting the database asset from the RDBMS to be exposed as the web service by receiving user input.

3. The method of claim 1 wherein the database asset comprises a query.

4. The method of claim 3 further comprising providing a managed query user interface to define the query and a parameter for the query.

5. The method of claim 4 wherein the managed query user interface limits exposed functionality to provide security.

6. The method of claim 1 wherein the database asset comprises a stored procedure and the predefined input comprises received input that defines parameters for a name of the stored procedure and input/output parameters.

7. The method of claim 1 wherein the output is in extensible markup language (XML) format.

8. The method of claim 1 wherein the web service is used to invoke the database operation by:
    converting a request received via the web service into a readable format;
    a rule engine performing the database operation using the request to obtain the result;
    the rule engine converting the result to a client format; and
    outputting the client format to a client.

9. An apparatus for exposing a database asset as a web service, comprising:
    (a) a relational database management system (RDBMS) executing in a computer system, wherein:
        (1) the RDBMS is part of a centralized framework that is configured to control access to the information;
        (2) one or more business rules and one or more workflow data processes manage the information from multiple sources;
        (3) the one or more business rules and the one or more workflow data processes are applied to the information from multiple sources, to consolidate the information and produce master data;
        (4) the master data is stored in a central business database of the RDBMS;
        (5) the master data is fed to one or more consuming business processes; and
        (6) access to, management of, and usage of, the master data is limited to the one or more workflow data processes of the centralized framework;
    (b) a rule, of the one or more business rules, that has been created via the centralized framework, wherein:
        (i) the rule contains an application programming interface (API) definition with predefined input and output for exposing the database asset from the RDBMS as the web service;
        (ii) the rule is exposed, via the centralized framework, as the web service; and
        (iii) the web service is utilized, via the centralized framework, to invoke a database operation based on the database asset, and to output a result.

10. The apparatus of claim 9, wherein the rule is created by selecting the database asset from the RDBMS to be exposed as the web service by receiving user input.

11. The apparatus of claim 9 wherein the database asset comprises a query.

12. The apparatus of claim 11 further comprising a managed query user interface that is used to define the query and a parameter for the query.

13. The apparatus of claim 12 wherein the managed query user interface limits exposed functionality to provide security.

14. The apparatus of claim 9 wherein the database asset comprises a stored procedure and the predefined input comprises received input that defines parameters for a name of the stored procedure and input/output parameters.

15. The apparatus of claim 9 wherein the output is in extensible markup language (XML) format.

16. The apparatus of claim 9 wherein the web service is used to invoke the database operation by:
    converting a request received via the web service into a readable format;
    a rule engine performing the database operation using the request to obtain the result;
    the rule engine converting the result to a client format; and
    outputting the client format to a client.

* * * * *